(12) United States Patent
Anderson

(10) Patent No.: US 9,154,731 B2
(45) Date of Patent: Oct. 6, 2015

(54) SYSTEMS AND METHODS FOR MODIFYING AN IMAGE IN A VIDEO FEED

(71) Applicant: CITRIX SYSTEMS, INC., Fort Lauderdale, FL (US)

(72) Inventor: Matthew Anderson, New York, NY (US)

(73) Assignee: CITRIX SYSTEMS, INC., Fort Lauderdale, FL (US)

(*) Notice: Subject to any disclaimer, the term of this patent is extended or adjusted under 35 U.S.C. 154(b) by 378 days.

(21) Appl. No.: 13/678,665

(22) Filed: Nov. 16, 2012

(65) Prior Publication Data

US 2014/0139613 A1    May 22, 2014

(51) Int. Cl.
| | |
|---|---|
| H04N 7/14 | (2006.01) |
| H04N 7/15 | (2006.01) |
| H04N 21/2343 | (2011.01) |
| H04N 21/2365 | (2011.01) |

(52) U.S. Cl.
CPC ............. *H04N 7/15* (2013.01); *H04N 21/2365* (2013.01); *H04N 21/234345* (2013.01); *H04N 21/234363* (2013.01)

(58) Field of Classification Search
CPC ................................. H04M 2203/50–2203/509
USPC .................... 348/14.01–14.16; 370/259–271, 370/351–357; 709/201–207, 217–248
See application file for complete search history.

(56) References Cited

U.S. PATENT DOCUMENTS

| | | | | |
|---|---|---|---|---|
| 6,507,356 | B1 * | 1/2003 | Jackel et al. | 348/14.06 |
| 6,970,580 | B2 * | 11/2005 | Kies | 382/118 |
| 7,388,981 | B2 * | 6/2008 | Jouppi | 382/154 |
| 7,720,283 | B2 * | 5/2010 | Sun et al. | 382/173 |
| 8,358,328 | B2 * | 1/2013 | Friel et al. | 348/14.08 |
| 8,463,317 | B2 * | 6/2013 | Lee et al. | 455/550.1 |
| 8,471,889 | B1 * | 6/2013 | Lee et al. | 348/14.07 |
| 2002/0113862 | A1 | 8/2002 | Center, Jr. et al. | |
| 2005/0143136 | A1 | 6/2005 | Lev | |
| 2005/0200764 | A1 | 9/2005 | Tsuruta et al. | |
| 2009/0309897 | A1 * | 12/2009 | Morita et al. | 345/629 |
| 2012/0050323 | A1 * | 3/2012 | Baron et al. | 345/632 |
| 2012/0147121 | A1 * | 6/2012 | Erb et al. | 348/14.01 |
| 2013/0342629 | A1 * | 12/2013 | North et al. | 348/14.01 |

FOREIGN PATENT DOCUMENTS

WO    2012106337 A1    8/2012

OTHER PUBLICATIONS

Marilyn M. Mantei et al., "Experiences in the use of a media space" Proceedings of The SIGCHI Conference on Human Factors in Computing Systems Human Factors in Computing Systems Reaching Through Technology, CHI '91, Jan. 1, 1991, pp. 203-208, XP055091685.

* cited by examiner

*Primary Examiner* — Hemant Patel

(74) *Attorney, Agent, or Firm* — BainwoodHuang

(57) ABSTRACT

Systems and method for modifying an image in a video feed are described. In some aspects, a plurality of images are received from a plurality of client computing devices. Each image within the plurality of images includes a face. The plurality of images are modified according to a baseline face position and a baseline face size. At least a portion of the modified plurality of images are provided for display to at least one of the plurality of client computing devices.

23 Claims, 6 Drawing Sheets

SYSTEMS AND METHODS FOR MODIFYING AN IMAGE IN A VIDEO FEED

FIELD OF THE INVENTION

The subject technology relates generally to a communication technology. More specifically, the subject technology relates to modifying an image in a video feed.

BACKGROUND OF THE INVENTION

Oftentimes, people participate in meetings, either online or offline. In offline meetings, people typically sit at eye level with one another (e.g., around a table) fostering a sense of togetherness, community, and creativity. However, in online video conferences, people tend to sit in different positions relative to their cameras (e.g., closer or further from the camera, centered or in a corner of the camera shot, etc.) causing an awkward view for other participants in the online video conference and preventing the development of the sense of togetherness, community, or creativity.

SUMMARY OF THE INVENTION

In some aspects, a computer-implemented method for modifying an image is provided. The method includes receiving, from multiple client computing devices, multiple images, each image within the multiple images including a face. The method includes modifying the multiple images according to a baseline face position and a baseline face size. The method includes providing, to at least one of the multiple client computing devices, at least a portion of the modified plurality of images for display.

In some aspects, a non-transitory computer-readable medium for modifying an image is provided. The computer-readable medium includes instructions. The instructions include code for receiving, from multiple client computing devices, multiple images, each image within the multiple images including a face. The instructions include code for modifying the multiple images according to a baseline face position and a baseline face size. The instructions include code for providing, to at least one of the multiple client computing devices, at least a portion of the modified plurality of images for display.

In some aspects, a system for modifying an image is provided. The system includes one or more processors and a memory. The memory includes instructions. The instructions include code for receiving, from multiple client computing devices, multiple images, each image within the multiple images including a face. The instructions include code for modifying the multiple images according to a baseline face position and a baseline face size. The instructions include code for providing, to at least one of the multiple client computing devices, at least a portion of the modified plurality of images for display.

BRIEF DESCRIPTION OF THE DRAWINGS

The foregoing discussion will be understood more readily from the following detailed description of the invention, when taken in conjunction with the accompanying drawings, in which.

DETAILED DESCRIPTION

As set forth above, a new approach for modifying facial image(s) in video feed(s) in online meeting(s) to have similar facial positions, appearing centered and at the same eye level, may be desirable.

The subject technology provides techniques for modifying facial image(s) in video feed(s) in online meeting(s) to have similar facial positions, appearing centered and at the same eye level. According to some aspects, a server receives, from multiple client computing devices of participants in an online meeting, multiple images in video feeds from the participants, each image within the multiple images including a face of a participant. The server modifies the multiple images according to a baseline face position and a baseline face size. For example, the baseline face position and the baseline face size can correspond to a centered face position and the largest face size of an image in the multiple images. The server provides, to at least one of the multiple client computing devices of the participants, at least a portion of the modified multiple images for display. For example, a client computing device of a specific participant could receive the modified image(s) from the other participants, but not from the specific participant.

Advantageously, the subject technology allows for image(s) from video feed(s) in online meeting(s) to appear centered and at the same eye level, fostering a sense of togetherness, community, and creativity among the participants in the online meeting.

Figure 1:
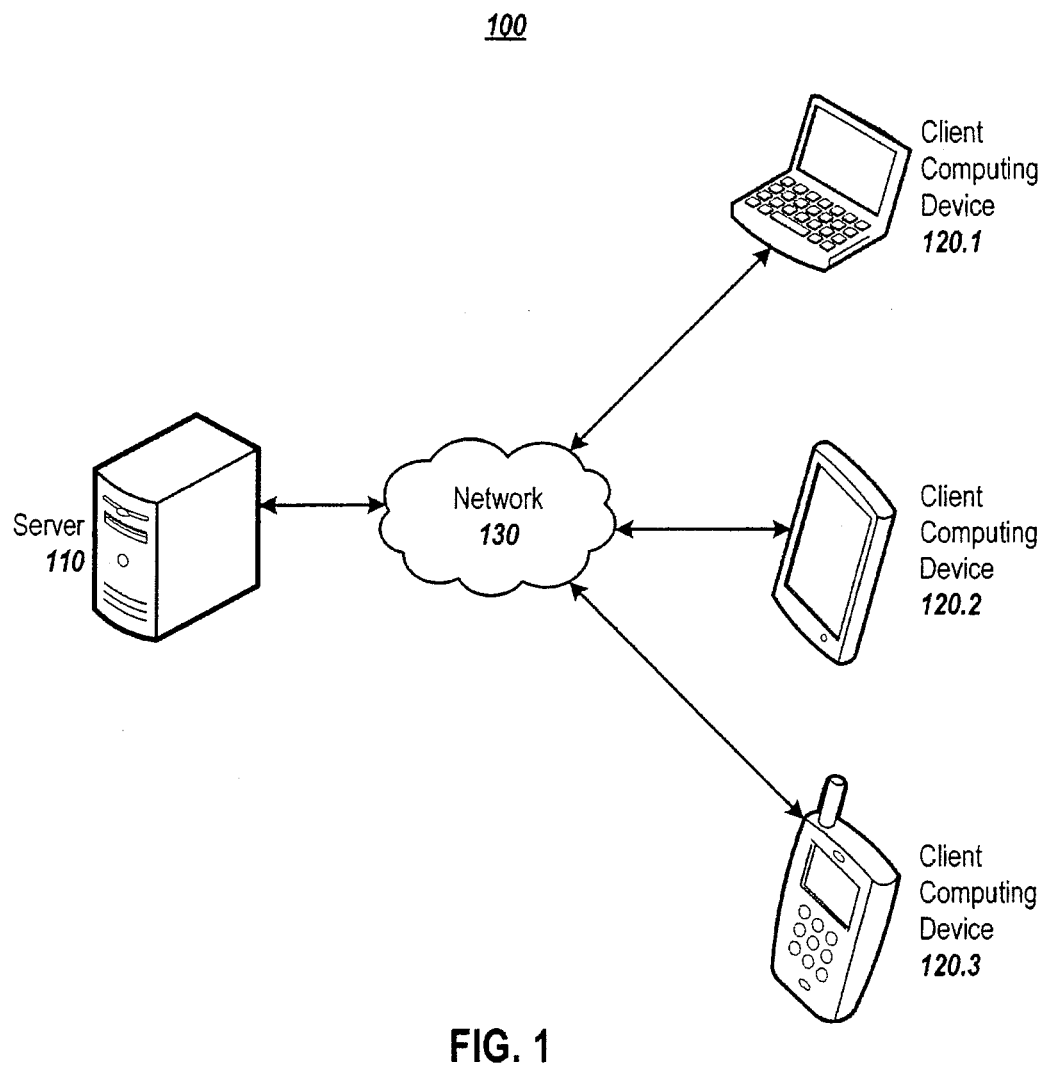
FIG. 1 illustrates an exemplary system for modifying an image.

FIG. 1 illustrates an exemplary system 100 for modifying an image. As shown, the system 100 includes a server 110 and multiple client computing devices 120 configured to communicate with one another via a network 130. The network 130 may include the Internet, an intranet, a local area network, a wide area network, a wired network, a wireless network, or a virtual private network (VPN). While one server 110 and three client computing devices 120 are illustrated, the subject technology may be implemented with any number of server(s) or client computing devices.

The server 110 includes one or more modules for implementing an online meeting including two or more participants, who access the meeting via client computing devices 120, for example, via a browser or a special purpose application executing on the client computing device 120. The server 110 may be implemented as a single machine with a single processor, a multi-processor machine, or a server farm including multiple machines with multiple processors. One example of the server 110 is described in more detail in conjunction with FIG. 2 below.

Each client computing device 120 may be a laptop computer (e.g., client computing device 120.1), a desktop computer, a mobile phone (e.g., client computing device 120.3), a personal digital assistant (PDA), a tablet computer (e.g., client computing device 120.2), a netbook, a television with one or more processors embedded therein or coupled thereto, a physical machine, or a virtual machine. Each client computing device 120 may include one or more of a keyboard, a mouse, a display, or a touch screen. Each client computing device 120 may also include a web browser configured to display webpages, for example a webpage of an online meeting service. Alternatively, the client computing device 120 may include a special-purpose application (e.g., a mobile phone or tablet computer application) for accessing the online meeting service.

Figure 2:
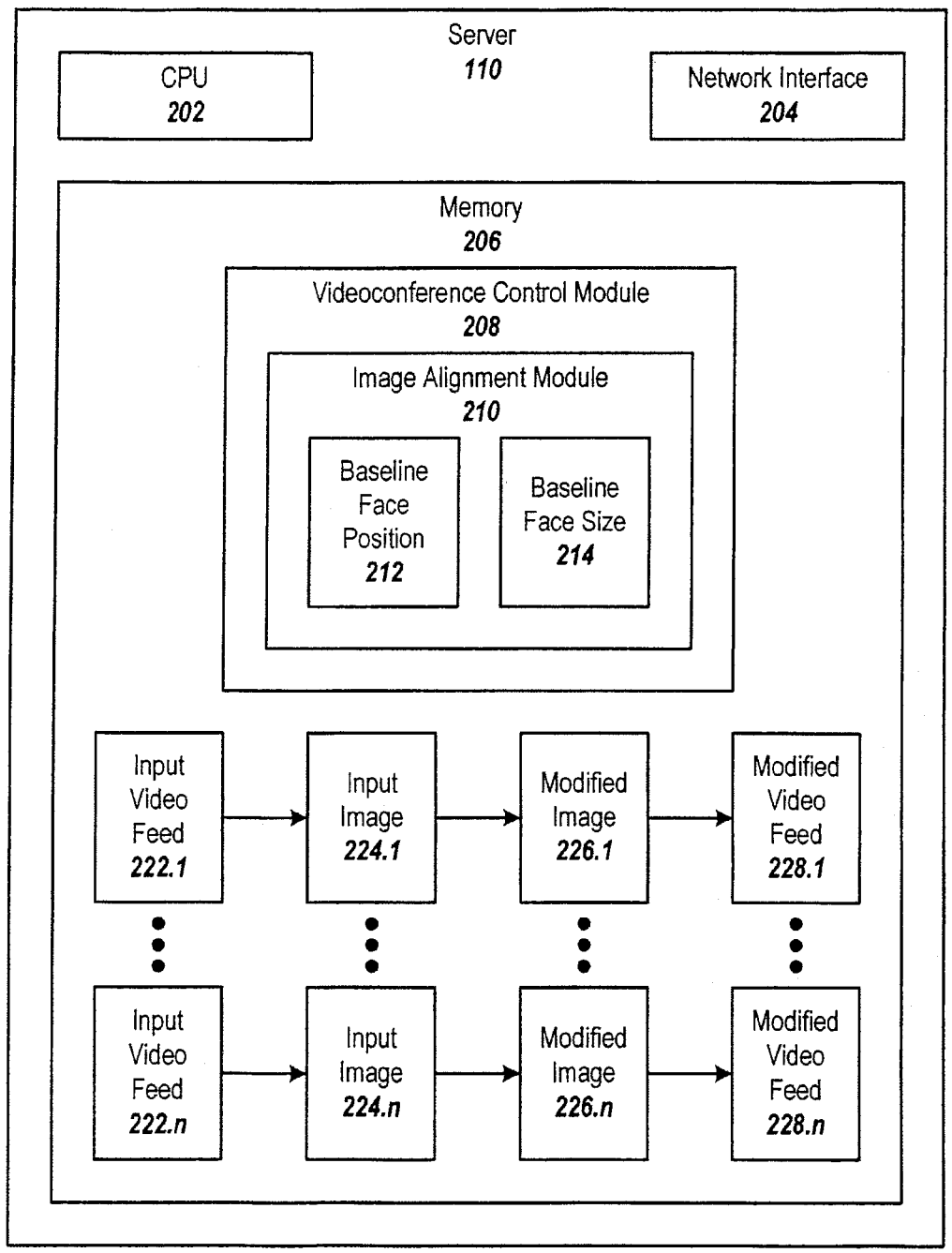
FIG. 2 illustrates an exemplary server of FIG. 1.

FIG. 2 illustrates an exemplary server 110 of FIG. 1. As shown, the server 110 includes a central processing unit (CPU) 202, a network interface 204, and a memory 206. The CPU 202 includes one or more processors. The CPU 202 is configured to execute computer instructions that are stored in a computer-readable medium, for example, the memory 206. The network interface 204 is configured to allow the server 110 to transmit and receive data in a network, e.g., network 130 of FIG. 1. The network interface 204 may include one or more network interface cards (NICs). The memory 206 stores data or instructions. The memory 206 may be one or more of a cache unit, a storage unit, an internal memory unit, or an external memory unit. As illustrated, the memory 206 includes a videoconference control module 208, input video feeds 222.1-*n*, input images 224.1-*n*, modified images 226.1-*n*, and modified video feeds 228.1-*n*.

The videoconference control module 208 is for controlling video conference(s) or online meeting(s). The videoconference control module 208 is configured to receive, from a client computing device (e.g., client computing device 120), a request to initiate an online meeting or videoconference. Upon receiving the request, the videoconference control module 208 is configured to transmit, to at least one additional client computing device, a request to join the online meeting or videoconference. Upon the additional client computing device accepting the request, the videoconference control module 208 initiates the online meeting and transmits video feeds between the client computing devices participating in the online meeting or videoconference. The videoconference control module 208 is configured to run multiple online meetings or videoconferences between different sets of client computing devices simultaneously.

As shown, the videoconference control module 208 includes an image alignment module 210. The image alignment module 210 stores a baseline face position 212 and a baseline face size 214. The baseline face position 212 and the baseline face size 214 may be either fixed or variable from one online meeting to another online meeting. In some examples, the baseline face position 212 and the baseline face size 214 correspond to one of the images from the feeds in the online meeting, for example, the image having the largest face size. In some examples, the baseline face position 212 correspond to a horizontally and vertically centered face positions with the eyes twice as far from the bottom of the image as the top of the image and the nose positioned at the horizontal center of the image. In some examples, the baseline face size 214 corresponds to the face occupying 80% of the height of the image.

During a videoconference or an online meeting set up in conjunction with the videoconference control module 208, the image alignment module 210 receives, from the multiple client computing devices involved in the videoconference or the online meeting, multiple images in video feeds, each image within the multiple images includes a face (e.g., of a participant in the online meeting). The image alignment module 210 modifies the multiple images according to the baseline face position 212 and the baseline face size 214. The image alignment module 210 provides, to at least one of the client computing devices involved in the videoconference or the online meeting, at least a portion of the modified multiple images for display. For example, the image alignment module 210 can provide all of the modified images to each client computing device or all of the modified images, except the image from a particular client computing device, to the particular client computing device.

In some examples, the image alignment module 210 receives input video feeds 222.1-*n* from client computing devices participating in a video conference or online meeting. Each input video feed 222.*k* includes an input image 224.*k* (e.g., the image currently being transmitted in the input video feed 222.*k*). The image alignment module converts the input image 224.*k* to a modified image 226.*k* according to the baseline face position 212 and the baseline face size 224, for example, to have the modified image 226.*k* match the baseline face position 212 and the baseline face size 214. The modified image 226.*k* could correspond to zooming into a portion of the input image 224.*k*. The image alignment module places the modified image 226.*k* into a modified video feed 228.*k*, and transmits the modified video feed 228.*k* to at least one of the client computing devices participating in the video conference or online meeting.

Figure 3:
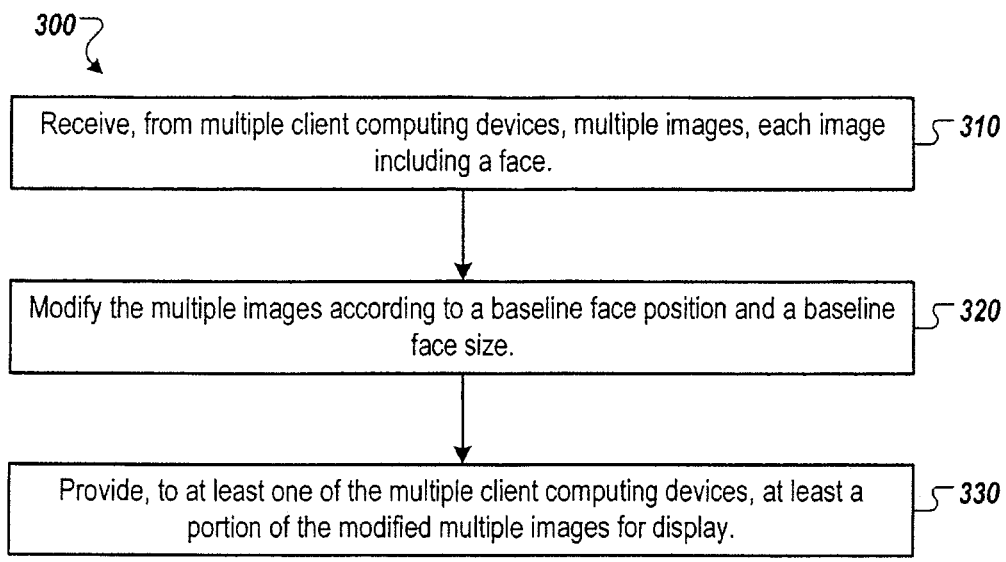
FIG. 3 illustrates an exemplary process for modifying an image.

FIG. 3 illustrates an exemplary process 300 for modifying an image.

The process 300 begins at step 310, where a server (e.g., server 110) receives, from multiple client computing devices (e.g., client computing devices 120 that are participating in a video conference or online meeting), multiple images (e.g., input images 224.1-*n* from input video feeds 222.1-*n*). Each image includes a face.

In step 320, the server modifies the multiple images according to a baseline face position and a baseline face size. The server can modify additional images in a specified video feed (e.g., video feed 222.*k*) in the same way as the initial image received in step 310. Alternatively, the video feeds can be modified once every threshold time period (e.g., every five minutes or every ten minutes) to account for changes in face position and face size over time (e.g., if a participant in a video conference or online meeting moves relative to his/her video camera or webcam) while not repositioning the image(s) so frequently as to discomfort the viewer of the image(s).

The baseline face position can correspond to a predetermined face position (e.g., centered with the distance between the eyes and the bottom of the image being twice the distance between the eyes and the top of the image). The baseline face position can include a baseline eye position. The baseline face size can correspond to a predetermined face size (e.g., 75% of the vertical size of the image). Alternatively, the baseline face position or the baseline face size can be determined during a specific online meeting or video conference. For example, the baseline face position or the baseline face size can correspond to a face position or face size of one of the images received in step 310, for example, the image among the images received in step 310 that has the largest face size. Modifying the multiple images according to the baseline face position and the baseline face size can include setting the face position in each image of the multiple images to the baseline face position and setting the face size in each image of the multiple images to the baseline face size.

In some aspects, the multiple images can also be modified according to a baseline face tilt the baseline face tilt can correspond to an upright face or a face tilt of one of the faces in the multiple images received in step 310.

In some aspects, each of the multiple images received in step 310 includes a face and a background behind the face. For example, a user participating in an online meeting from his/her office may have a white wall in the background. A user participating in the online meeting from his/her kitchen at home may have a stove, a refrigerator, or kitchen cabinets in the background. A user participating in the online meeting from a coffee shop can have the décor or the bar of the coffee shop, as well as other patrons of the coffee shop, in the background. In order to create an atmosphere of togetherness, community, and creativity, the server may replace, with a default background, the background of each of the plurality of images. The default background can be a solid colored background (e.g., a white or light blue background) or a background from one of the images received in step 310. In some aspects, the default background includes a blur or de-saturating of color that brings focus on the face. In some aspects, the face is programmatically separated from the background, and a new default background is added to each modified image in place of the background of the input image.

In some aspects, the white balance or the contrast of the multiple images is also adjusted. The white balance may be set to a baseline white balance and the contrast may be set to a baseline contrast. As used herein, the phrase "white balance" encompasses its plain and ordinary meaning including but not limited to a global adjustment of intensity of colors in an image. As used herein, the term "contrast" encompasses its plain and ordinary meaning including but not limited to a difference in luminance and/or color intensity that makes an object displayed in an image distinguishable from the surroundings of the object.

In step 330, the server provides, to at least one of the multiple client computing devices, at least a portion of the modified multiple images for display at the client computing device(s). After step 330, the process 300 ends.

The process 300 of FIG. 3 is described above as being implemented on a server (e.g., server 110). However, one or more of the steps 310-330 of the process 300 may be implemented on a client computing device that is sending an image or a video, a client computing device that is receiving the image or the video, the server, or a combination of two or more of the above. In some cases, the subject technology may be implemented in the absence of a server, and the client computing devices may implement the process 300, described above, in a peer-to-peer system.

Figure 4:
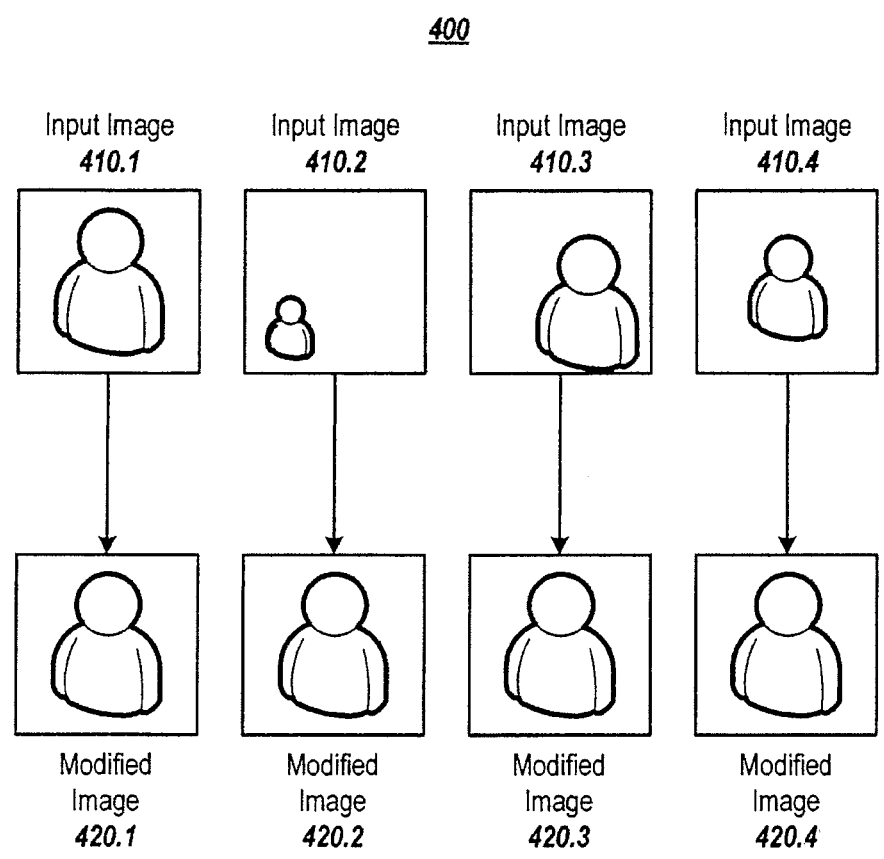
FIG. 4 illustrates an exemplary set of input images and modified images.

FIG. 4 illustrates an exemplary set 400 of input images 410.1-4 and modified images 420.1-4. The input images 410.1-4 can correspond to the input images 224.1-n of FIG. 2. The modified images 420.1-4 can correspond to the modified images 226.1-n of FIG. 2. While the subject technology is illustrated in FIG. 4 with four modified images 420.1-4 being derived from four input images 410.1-4, the subject technology can be implemented with any number of input images and modified images.

As shown, the input images 410.1-4 include different views of participants in a videoconference or online meeting. The input images 410.1-4 include the views of the participants at different positions relative to the camera. For example, in input image 410.1, the participant is centered and the participant's head and shoulders are clearly visible. In input image 410.2, the participant is in a corner of the image captured by the camera. In input image 410.3, the participant's head and shoulders are clearly visible, but the participant is at the edge of the image captured by the camera. In input image 410.4, the participant's head and shoulders are centered in the image, but the participant is positioned further back from the camera than the position of input images 410.1 and 410.3. The faces in the input images 410.1-4 have different face positions and face sizes, causing an awkward unusual feeling, rather than a feeling of togetherness, when the input images 410.1-4 are viewed together. As a result, a viewer of the input images 410.1-4 may not feel as though he/she is together with the people pictured in the input images 410.1-4 or sitting around a table in real-life with them.

As illustrated in FIG. 4, the server (e.g., server 110) selects a baseline face position (e.g., baseline face position 212) and a baseline face size (e.g., baseline face size 214) corresponding to the input image 410.1. The input image 410.1 may have been selected as the baseline image because the input image 410.1 has the largest face size and the most centered face position of all of the input images. Alternatively, a predetermined baseline face position and baseline face size may be used.

Each modified image 420.$k$ includes the face from the corresponding input image 410.$k$. Each modified image has a face position and a face size corresponding to the baseline face position and the baseline face size (e.g., the face position and face size of input image 410.1). As a result, the faces in the modified images 420.1-4 appear to be at the same face position and face size, fostering a feeling of togetherness similar to people sitting together around a table in real-life.

Figure 5:
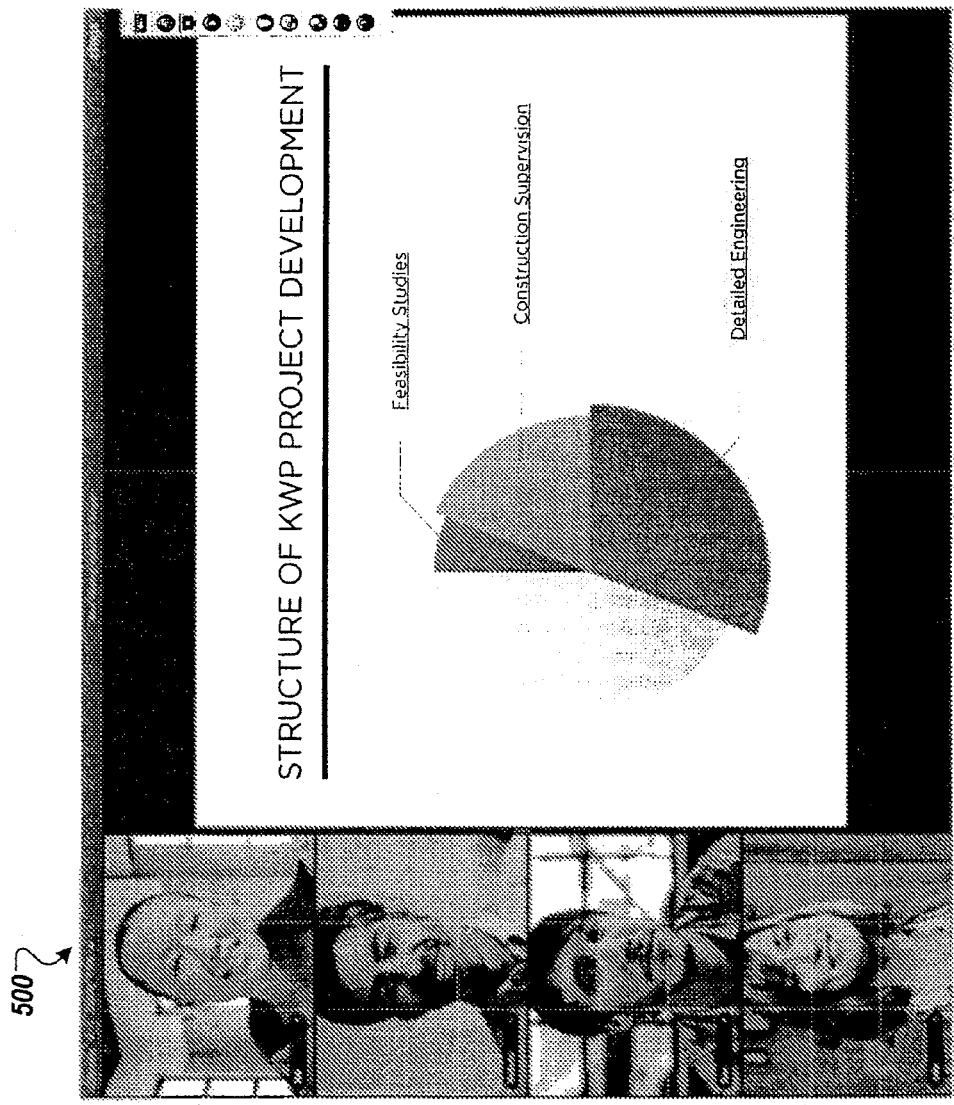
FIG. 5 illustrates an exemplary display of an online meeting.

FIG. 5 illustrates an exemplary display 500 of an online meeting.

As shown, the display 500 includes multiple images of faces and a shared workspace. The shared workspace includes an image from a document or file that may be discussed in the meeting. Each of the images of a face can include a face that has a modified face position and a modified face size according to the techniques described herein. For example, as shown in FIG. 5, all of the faces in the display 500 are centered and have an eye position approximately two thirds of the way from the bottom to the top of the image. The display 500 can correspond to a display where the default face position and the default face size are set based on the input image with the face that is the nearest to the camera. The white guide lines in the images of the faces of the display 500 of FIG. 5 are used to illustrate one eye position for a baseline face position. As shown, the eye position is approximately two thirds of the way from the bottom to the top of the image.

Figure 6:
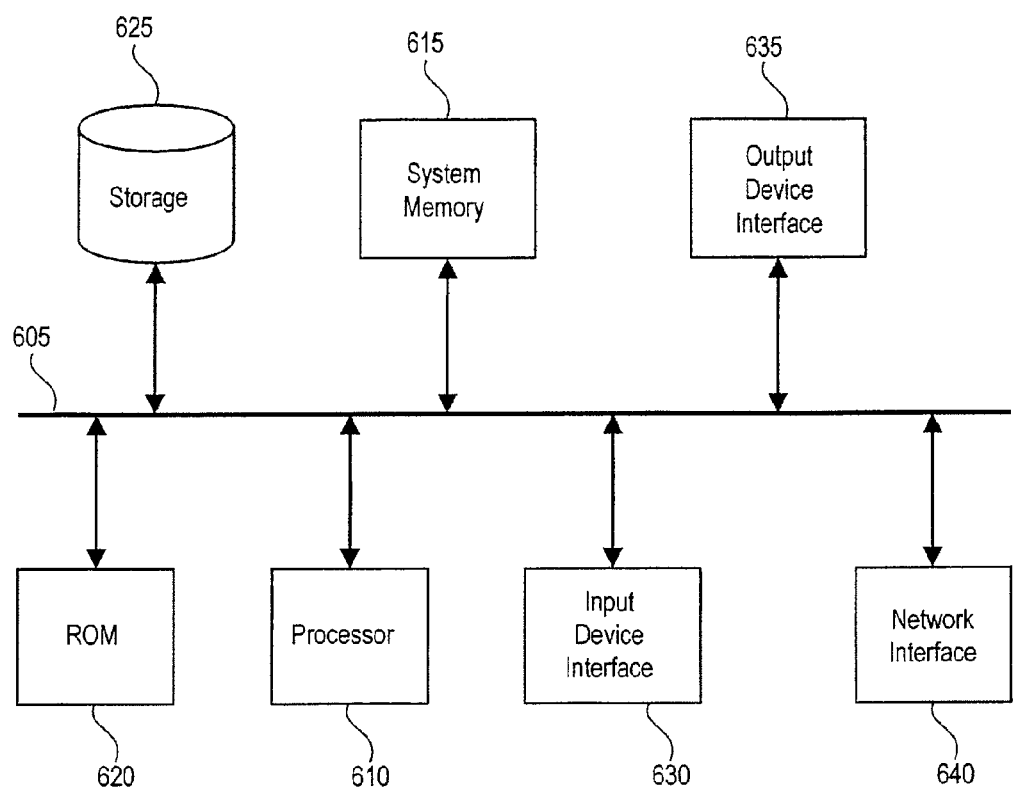
FIG. 6 conceptually illustrates an exemplary electronic system with which some implementations of the subject technology are implemented.

FIG. 6 conceptually illustrates an electronic system 600 with which some implementations of the subject technology are implemented. For example, one or more of the server 110, or the client computing devices 120 may be implemented using the arrangement of the electronic system 600. The electronic system 600 can be a computer (e.g., a mobile phone, PDA), or any other sort of electronic device. Such an electronic system includes various types of computer readable media and interfaces for various other types of computer readable media. Electronic system 600 includes a bus 605, processing unit(s) 610, a system memory 615, a read-only memory 620, a permanent storage device 625, an input device interface 630, an output device interface 635, and a network interface 640.

The bus 605 collectively represents all system, peripheral, and chipset buses that communicatively connect the numerous internal devices of the electronic system 600. For instance, the bus 605 communicatively connects the processing unit(s) 610 with the read-only memory 620, the system memory 615, and the permanent storage device 625.

From these various memory units, the processing unit(s) 610 retrieves instructions to execute and data to process in order to execute the processes of the subject technology. The processing unit(s) can be a single processor or a multi-core processor in different implementations.

The read-only-memory (ROM) 620 stores static data and instructions that are needed by the processing unit(s) 610 and other modules of the electronic system. The permanent storage device 625, on the other hand, is a read-and-write memory device. This device is a non-volatile memory unit that stores instructions and data even when the electronic system 600 is off. Some implementations of the subject technology use a mass-storage device (for example a magnetic or optical disk and its corresponding disk drive) as the permanent storage device 625.

Other implementations use a removable storage device (for example a floppy disk, flash drive, and its corresponding disk drive) as the permanent storage device 625. Like the permanent storage device 625, the system memory 615 is a read-and-write memory device. However, unlike storage device 625, the system memory 615 is a volatile read-and-write memory, such a random access memory. The system memory 615 stores some of the instructions and data that the processor needs at runtime. In some implementations, the processes of the subject technology are stored in the system memory 615, the permanent storage device 625, or the read-only memory 620. For example, the various memory units include instructions for modifying an image in a video feed in accordance with some implementations. From these various memory units, the processing unit(s) 610 retrieves instructions to execute and data to process in order to execute the processes of some implementations.

The bus 605 also connects to the input and output device interfaces 630 and 635. The input device interface 630 enables the user to communicate information and select commands to the electronic system. Input devices used with input device interface 630 include, for example, alphanumeric keyboards and pointing devices (also called "cursor control devices"). Output device interfaces 635 enables, for example, the display of images generated by the electronic system 600. Output devices used with output device interface 635 include, for example, printers and display devices, for example cathode ray tubes (CRT) or liquid crystal displays (LCD). Some implementations include devices for example a touch screen that functions as both input and output devices.

Finally, as shown in FIG. 6, bus 605 also couples electronic system 600 to a network (not shown) through a network interface 640. In this manner, the electronic system 600 can be a part of a network of computers (for example a local area network ("LAN"), a wide area network ("WAN"), or an Intranet, or a network of networks, for example the Internet. Any or all components of electronic system 600 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method for modifying an image, the method comprising:
   receiving, from a plurality of client computing devices, a plurality of images, each image within the plurality of images comprising a face;
   modifying the plurality of images according to a baseline face position and a baseline face size, wherein the baseline face position comprises a face position in a first image within the plurality of images, and wherein the baseline face size comprises a face size in the first image; and
   providing, to at least one of the plurality of client computing devices, at least a portion of the modified plurality of images for display.

2. The method of claim 1, wherein modifying the plurality of images according to the baseline face position and the baseline face size comprises:
   setting a face position in each image of the plurality of images to the baseline face position; and
   setting a face size in each image of the plurality of images to the baseline face size.

3. The method of claim 1, further comprising:
   setting a white balance in each image of the plurality of images to a baseline white balance.

4. The method of claim 1, further comprising:
   setting a contrast in each image of the plurality of images to a baseline contrast.

5. The method of claim 1, wherein the plurality of images comprise images from video feeds.

6. The method of claim 5, wherein modifying the plurality of images comprises modifying the video feeds.

7. The method of claim 6, wherein the video feeds are modified according to the baseline face position and the baseline face size once per threshold time period.

8. The method of claim 1, wherein the baseline face position comprises a predetermined face position, and wherein the baseline face size comprises a predetermined face size.

9. The method of claim 1, further comprising:
   determining the baseline face position and the baseline face size.

10. The method of claim 1, wherein the first image comprises an image within the plurality of images having a largest face size among the plurality of images.

11. The method of claim 1, wherein the baseline face position comprises a baseline eye position.

12. The method of claim 1, further comprising:
modifying the plurality of images according to a baseline face tilt.

13. The method of claim 1, wherein each image within the plurality of images comprises a background, the method further comprising:
replacing, with a default background, the background of each of the plurality of images.

14. A non-transitory computer-readable medium for modifying an image, the computer-readable medium comprising instructions which, when executed by one or more computers, cause the one or more computers to implement a method, the method comprising:
receiving, from a plurality of client computing devices, a plurality of images, each image within the plurality of images comprising a face;
modifying the plurality of images according to a baseline face position and a baseline face size, wherein the baseline face position comprises a face position in a first image within the plurality of images, and wherein the baseline face size comprises a face size in the first image; and
providing, to at least one of the plurality of client computing devices, at least a portion of the modified plurality of images for display.

15. The computer-readable medium of claim 14, wherein the plurality of images comprise images from video feeds.

16. The computer-readable medium of claim 15, wherein modifying the plurality of images comprises modifying the video feeds.

17. The computer-readable medium of claim 16, wherein the video feeds are modified according to the baseline face position and the baseline face size once per threshold time period.

18. The computer-readable medium of claim 14, wherein the baseline face position comprises a predetermined face position, and wherein the baseline face size comprises a predetermined face size.

19. A system for modifying an image, the system comprising:
one or more processors; and
a memory comprising instructions which, when implemented by the one or more processors, cause the one or more processors to implement a method, the method comprising:
receiving, from a plurality of client computing devices, a plurality of images, each image within the plurality of images comprising a face;
modifying the plurality of images according to a baseline face position and a baseline face size, wherein the baseline face position comprises a face position in a first image within the plurality of images, and wherein the baseline face size comprises a face size in the first image; and
providing, to at least one of the plurality of client computing devices, at least a portion of the modified plurality of images for display.

20. A computer-implemented method for modifying an image, the method comprising:
receiving, from a plurality of client computing devices, a plurality of images, each image within the plurality of images comprising a face of a corresponding participant in an online meeting;
determining a selected one of the plurality of images by, at least in part, selecting one of the plurality of images having a face with a largest size of the faces in the plurality of images;
determining a baseline face size in response to the selected one of the plurality of images by, at least in part, setting the baseline face size equal to the size of the face in the selected one of the plurality of images;
modifying the plurality of images according to a baseline face position and the baseline face size; and
providing, to at least one of the plurality of client computing devices, at least a portion of the modified plurality of images for display.

21. The method of claim 20, wherein determining the selected one of the plurality of images further includes selecting one of the plurality of images including a face having a most centered position of the faces in the plurality of images, and further comprising:
determining the baseline face position in response to the selected one of the plurality of images by, at least in part, setting the baseline face position equal to the position of the face in the selected one of the plurality of images.

22. The method of claim 21, further comprising:
determining a baseline face tilt in response to the selected one of the plurality of images by setting the baseline face tilt to a face tilt of the face in the selected one of the plurality of images; and
modifying the face in each of the plurality of images according to the baseline face tilt.

23. A computer-implemented method for modifying an image, the method comprising:
receiving, from a plurality of client computing devices, a plurality of images, each image within the plurality of images comprising a face of a corresponding participant in an online meeting;
deriving a baseline face size from a size of a face in a first one of the plurality of images;
modifying the plurality of images according to a baseline face position and the baseline face size, wherein modifying the plurality of images according to the baseline face size includes modifying a size of a face in a second one of the plurality of images to match the size of the face in the first one of the plurality of images; and
providing, to at least one of the plurality of client computing devices, at least a portion of the modified plurality of images for display.

* * * * *